(12) United States Patent
Rivolta et al.

(10) Patent No.: US 11,037,436 B2
(45) Date of Patent: Jun. 15, 2021

(54) THREE-LEVEL MOTION DETECTOR USING ACCELEROMETER DEVICE IN KEY FOB APPLICATION

(71) Applicant: STMicroelectronics S.r.l., Agrate Brianza (IT)

(72) Inventors: Stefano Paolo Rivolta, Desio (IT); Federico Rizzardini, Settimo Milanese (IT); Daniele Arceri, Cislago (IT); Alessandra Maria Rizzo Piazza Roncoroni, Abbiategrasso (IT); Marco Bianco, Cesano Boscone (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 0 days.

(21) Appl. No.: 16/296,016

(22) Filed: Mar. 7, 2019

(65) Prior Publication Data

US 2020/0286366 A1    Sep. 10, 2020

(51) Int. Cl.
*G08C 17/00* (2006.01)
*G07C 9/00* (2020.01)
(Continued)

(52) U.S. Cl.
CPC .............. *G08C 17/00* (2013.01); *B60R 25/24* (2013.01); *B60R 25/406* (2013.01);
(Continued)

(58) Field of Classification Search
CPC ....... G08C 17/00; B60R 25/24; B60R 25/406; G07C 9/00309
(Continued)

(56) References Cited

U.S. PATENT DOCUMENTS 8,849,605 B2    9/2014  Lakhzouri et al.
9,593,522 B1 *  3/2017  Murar .................... E05F 15/77
(Continued)

FOREIGN PATENT DOCUMENTS

EP    0 808 91 A2    11/1997
EP    2 612 795 A1    7/2013
(Continued)

OTHER PUBLICATIONS

Author: Md. Shakil, Md. Rashid, Ajit B. Patil Title: Automobile Theft Prevention Using 3D Gesture Key Fob and Cryptography Date: Feb. 26-27, 2015 Publisher: IEEE, 2015 International Conference on Computing Com. Control and Automation, pp. 306-309 (Year: 2015).*

*Primary Examiner* — Yong Hang Jiang
(74) *Attorney, Agent, or Firm* — Seed IP Law Group LLP

(57) ABSTRACT

A remote access device and methods of operation thereof are provided for accessing a physical object or location. The remote access device includes an accelerometer, a wireless transmitter, and control circuitry. The control circuitry causes the wireless transmitter to transition between a first operating mode and a second operating mode in response to receiving signals from the accelerometer indicating a first change in motion states of the remote access device. The control circuitry causes the wireless transmitter to transition between a first operating mode and a second operating mode in response to receiving signals from the accelerometer indicating a second change in motion states of the remote access device. The control circuitry further causes the wireless transmitter to transition between the first operating mode and the second operating mode in response to receiving signals from the accelerometer indicating a third change in motion states of the remote access device.

20 Claims, 11 Drawing Sheets

(51) Int. Cl.
  *B60R 25/40*  (2013.01)
  *B60R 25/24*  (2013.01)
(52) U.S. Cl.
  CPC ............... *G07C 9/00309* (2013.01); *G07C 2009/00325* (2013.01); *G08C 2201/32* (2013.01)
(58) Field of Classification Search
  USPC ........................................ 340/5.64
  See application file for complete search history.

(56) References Cited

U.S. PATENT DOCUMENTS

| | | | |
|---|---|---|---|
| 10,766,458 B2* | 9/2020 | Casamassima | B60R 25/209 |
| 2006/0114100 A1* | 6/2006 | Ghabra | E05B 81/78 |
| | | | 340/5.61 |
| 2014/0368313 A1* | 12/2014 | Seiberts | G07C 9/00309 |
| | | | 340/5.61 |
| 2015/0116078 A1* | 4/2015 | Mishra | G07C 9/00309 |
| | | | 340/5.51 |
| 2015/0309767 A1* | 10/2015 | Osoinach | B60Q 5/001 |
| | | | 340/4.42 |

FOREIGN PATENT DOCUMENTS

| | | |
|---|---|---|
| FR | 2 786 802 A1 | 6/2000 |
| WO | 2016/177673 A1 | 11/2016 |
| WO | 2018/12508 A1 | 7/2018 |
| WO | 2018/127407 A1 | 7/2018 |

* cited by examiner

THREE-LEVEL MOTION DETECTOR USING ACCELEROMETER DEVICE IN KEY FOB APPLICATION

BACKGROUND

Technical Field

The present disclosure relates to remote keyless entry devices.

Description of the Related Art

Remote keyless entry (RKE) devices provide access to physical objects or locations, such as vehicles, rooms, or buildings. RKE devices typically have a fob form factor and are sized and shaped to allow them to be held in a user's hand or stored in a user's pocket. RKE devices emit wireless signals with a short range (e.g., 5-20 meters) that cause a corresponding physical device, object, or location to provide access thereto. To facilitate long battery life, some RKE devices emit wireless signals only during certain states. For instance, some RKE devices only emit wireless signals when a button is pressed.

For user convenience, some RKE devices are configured to automatically emit wireless signals without pressing a button so that access is provided when the user approaches the physical object or location. This automatic wireless signal emission can increase current consumption by the RKE device. To improve battery life, some automatic RKE devices emit wireless signals when motion is detected that exceeds a certain threshold or when a step is detected. However, these previously-implemented solutions may lead to an undesirable level of current consumption because wireless signals are often emitted during periods when the user is moving and is far away from the corresponding physical object or location.

BRIEF SUMMARY

A remote access device may be summarized as including a wireless transmitter and an accelerometer, the remote access device being configured to cause the wireless transmitter to transition between a first operating mode and a second operating mode in response to signals generated by the accelerometer indicating a first change in motion states of the remote access device between a first motion state and a second motion state, cause the wireless transmitter to transition between the first operating mode and the second operating mode in response to signals generated by the accelerometer indicating a second change in motion states of the remote access device between the first motion state and a third motion state, and cause the wireless transmitter to transition between the first operating mode and the second operating mode in response to signals generated by the accelerometer indicating a third change in motion states of the remote access device between the second motion state and the third motion state. The wireless transmitter may be configured to not transmit wireless signals during the first operating mode and transmit wireless signals during the second operating mode.

The first motion state may be a motionless state, the second motion state may be a low motion state above a first given threshold and below a second given threshold, and the third motion state may be a high motion state above the second given threshold. The remote access device may be configured to detect the first motion state by detecting that values of the signals received from the accelerometer are less than the first threshold. The remote access device may be configured to detect the second motion state by detecting that values of the signals generated by the accelerometer exceed the first threshold and do not exceed the second threshold. The remote access device may be configured to detect the third motion state by detecting that values of the signals generated by the accelerometer exceed the first threshold and the second threshold.

The first change in motion states may correspond to a transition between the first motion state and the second motion state across a first motion threshold, the second change in motion states may correspond to a transition between the first motion state and the third motion state across a second motion threshold, and the third change in motion states may correspond to a transition between the second motion state and the third motion state across the second motion threshold. The remote access device may be configured to generate one or more hardware interrupts in response to detecting the first change in motion states, in response to detecting the second change in motion states, and in response to detecting the third change in motion states. The remote access device may further include a controller electrically communicatively coupled to the accelerometer. The controller may be configured to provide a security code and a function code to the wireless transmitter for transmission in connection with generating the one or more hardware interrupts.

The wireless transmitter may operate in the first operating mode, transitions to the second operating mode in response to receiving an interrupt signal, and transitions from the second operating mode to the first operating mode after transmitting signals for a defined period. The controller may determine an occurrence of a change in motion states as a result of receipt, at a first time, of a first signal generated by the accelerometer that is within a first defined range; and receipt, in a time period subsequent to the first time, of a plurality of signals generated by the accelerometer that are within a second defined range different than the first defined range.

The accelerometer or controller may be further configured to implement, in response to receiving or detecting the signals indicating the first change in motion states, first settings for a set of hardware registers of the accelerometer or controller; implement, in response to detection that the signals indicate the second change in motion states, second settings for the set of hardware registers; and implement, in response to detection that the signals indicate the third change in motion states, third settings for the set of hardware registers of the accelerometer.

A remote access device may be summarized as including a wireless transmitter configured to operate in a first operating mode and in a second operating mode; and an accelerometer configured to detect a first change in motion states of the remote access device between a first motion state and a second motion state, detect a second change in motion states of the remote access device between the second motion state and the third motion state, detect a third change in motion states of the remote access device between the first motion state and the third motion state, and generate, in response to detecting any of the first change in motion states, the second change in motion states, and the third change in motion states, a hardware interrupt that causes the wireless transmitter to transition from the first operating mode to the second operating mode.

The first motion state may be a state in which the remote access device is motionless, the second motion state may be a state in which the remote access device is moving with a low motion intensity below a defined threshold, and the third motion state may be a state in which the remote access device is moving with a high motion intensity equal to or exceeding the defined threshold. The first operating mode may be a mode in which the wireless transmitter does not transmit wireless signals, and the second operating mode may be a mode in which the wireless transmitter transmits a signal that includes at least one of a security code and a function code. The hardware interrupt may cause the wireless transmitter to transition from the first operating mode to the second operating mode for a defined period, and the wireless transmitter may be configured to transition from the second operating mode to the first operating mode after the defined period.

A method may be summarized as including causing a wireless transmitter to operate in a first mode at a first time; detecting a first change in motion states based on a first set of measurements by the accelerometer at a second time subsequent to the first time; causing the wireless transmitter to transition to a second mode for a defined period in response to detecting the first change in motion states; detecting a second change in motion states based on a second set of measurements by the accelerometer at a third time subsequent to the first time; causing the wireless transmitter to transition to the second mode for the defined period in response to detecting the second change in motion states; detecting a third change in motion states based on a third set of measurements by the accelerometer at a fourth time subsequent to the first time; and causing the wireless transmitter to transition to the second mode for the defined period in response to detecting the third change in motion states.

The first change in motion states may be between a first motion state of a remote access device and a second motion state of the remote access device, the second change in motion states may be between the first motion state and a third motion state of the remote access device, and the third change in motion states may be between the second motion state and the third motion state. The defined period may be a period in which the wireless transmitter transmits a defined number of packets. Causing the wireless transmitter to operate in the second mode for the defined period may include generating a hardware based interrupt.

The method may further include providing, in response to detecting the first change in motion states, a security code and a function code to the wireless transmitter; providing, in response to detecting the second change in motion states, a second security code and the function code to the wireless transmitter; and providing, in response to detecting the third change in motion states, a third security code and the function code to the wireless transmitter.

The method may further include causing the wireless transmitter to transition to the first mode after the defined period.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the vehicle environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

Figure 1A:
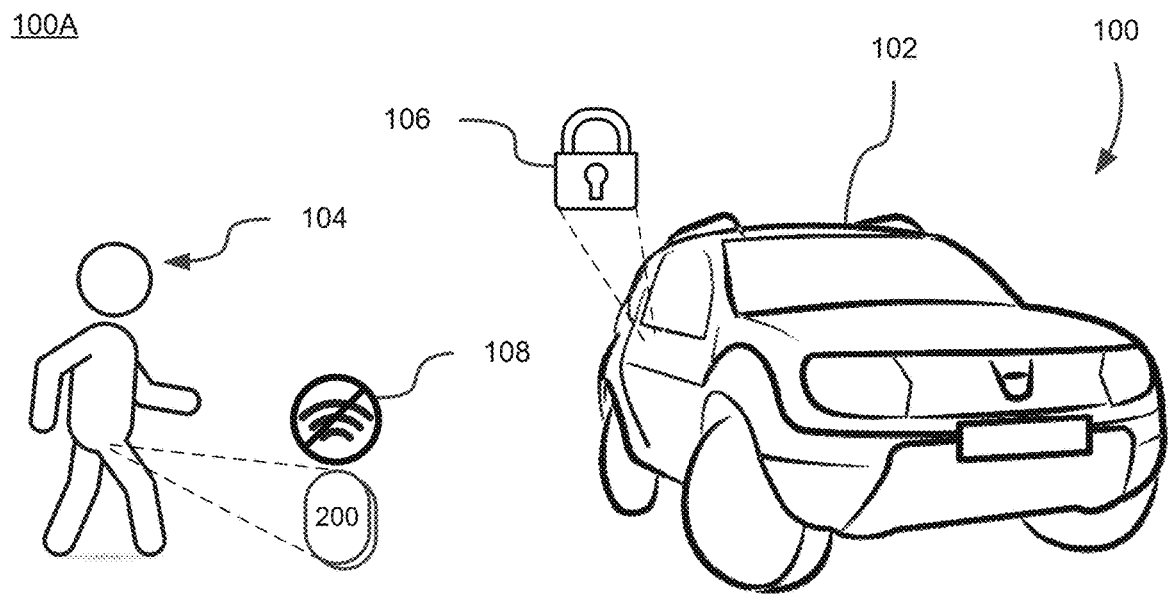
FIG. 1A is an environment in which a remote access device operates at a first time according to one or more embodiments.
Figure 1B:
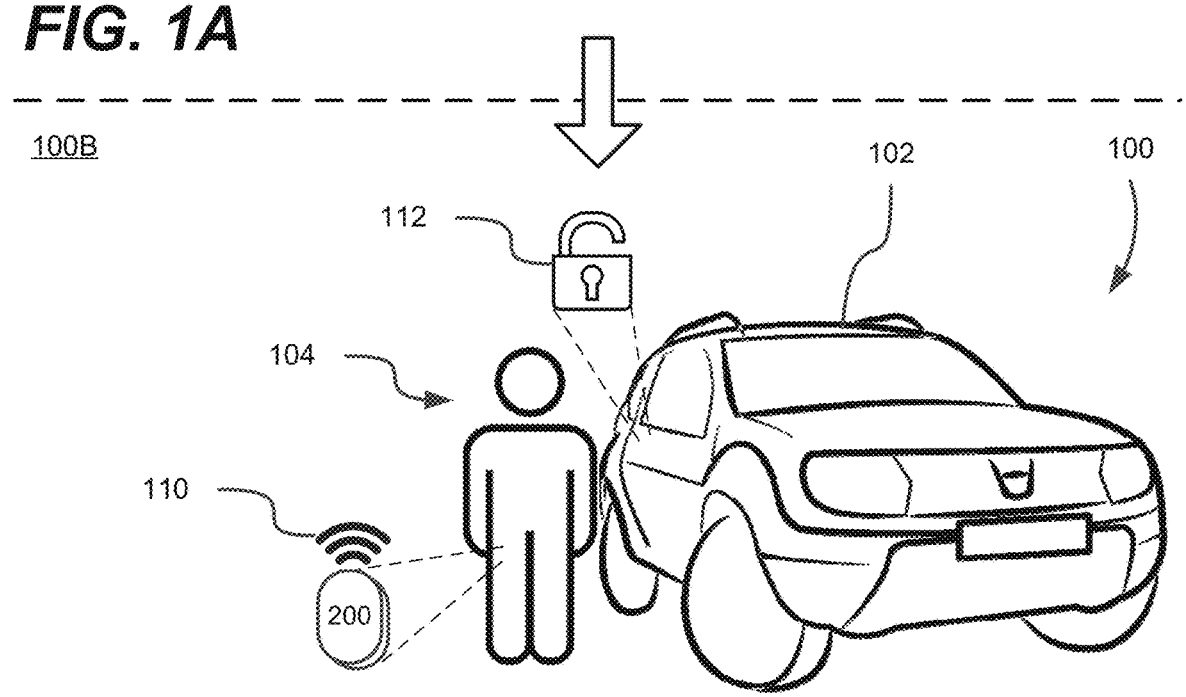
FIG. 1B is an environment in which a remote access device operates at a second time according to one or more embodiments.

FIG. 1A shows an environment 100 in which a remote access device 200 operates at a first time, and FIG. 1B shows the environment 100 in which the remote access device operates at a second time according to one or more embodiments. The environment includes a physical object 102 and a user 104 possessing the remote access device 200 providing access to the physical object 102. In FIGS. 1A and 1B, the physical object 102 depicted is a vehicle, but the physical object 102 may be any other object or location to which access is restricted, such as a home or secure portion of a building. At the first time (i.e., in FIG. 1A), the physical object 102 is in a locked state 106 preventing the user 104 and others from accessing the physical object 102.

The remote access device 200 is configured to automatically transmit a signal for providing access to the physical object 102 in response to detecting a change in motion states. The remote access device 200 transitions from a first operating mode 108 at the first time (FIG. 1A) to a second operating mode 110 at the second time (FIG. 1B) as a result of a change in motion states of the remote access device 200. At the first time, the remote access device 200 detects that the user 104 is in a given motion state—for instance, detecting that the user 104 is walking. The remote access device 200 at the first time is operating in the first operating mode 108 in which the remote access device 200 does not emit wireless communication signals for providing access to the physical object 102.

At the second time, in FIG. 1B, the operating mode of the remote access device 200 changes in response to detecting that a change in motion characteristics of the user 104. For example, the remote access device 200 detects that the user 104 has changed to a different motion state, such as slowing down or stopping. In response, the remote access device 200 transitions from the first operating mode 108 to the second operating mode 110 in which the remote access device 200 emits wireless communication signals for providing access to the physical object 102. The physical object 102 receives the wireless communication signals emitted by the remote access device 200, which causes the physical object 102 to transition to an unlocked state 112. After the remote access device 200 has been in the second operating mode 110 for a defined period, the remote access device 200 transitions back to the first operating mode 108.

The remote access device 200 consumes a larger amount of power when operating in the second operating mode 110 than when operating in the first operating mode 108. The remote access device 200 operates in the second operating mode 110 for a defined period in response to detecting a change in motion states. After the defined period, the remote access device 200 reverts to the first operation mode in which no wireless communication signals are emitted by the remote access device 200. As a result, the remote access device 200 transmits wireless signals in response to detecting a change in motion states rather than during periods of constant motion or stillness. Accordingly, power consumption by the remote access device 200 may be reduced in comparison with previously-implemented remote access devices.

Figure 2:
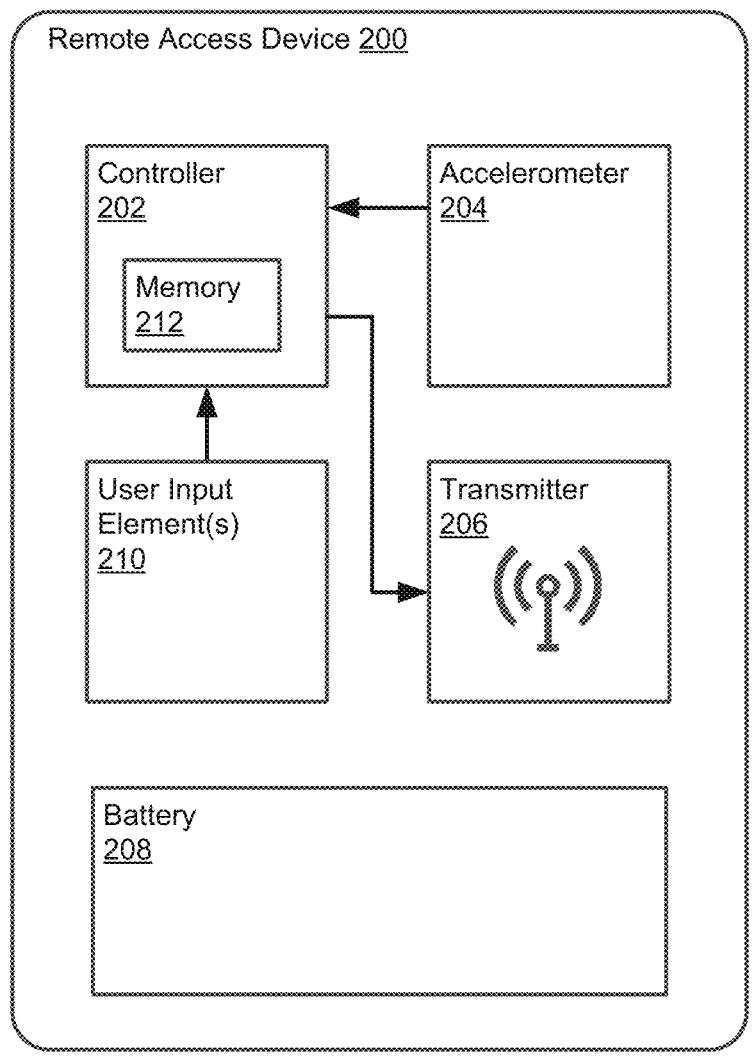
FIG. 2 is a block diagram of the remote access device of FIG. 1 according to a first embodiment.

FIG. 2 shows a block diagram of the remote access device 200 according to one or more embodiments. The remote access device 200 includes a controller 202, an accelerometer 204, and a wireless transmitter 206. The remote access device 200 is configured to include a battery 208 powering the controller 202, the accelerometer 204, and the wireless transmitter 206. In some embodiments, the battery 208 may be a rechargeable battery fixed within the remote access device 200 and the remote access device 200 may include a port or wireless charging capabilities for charging the battery 208. In some embodiments, the battery 208 may be removable or replaceable in the remote access device 200. The remote access device 200 may include one or more user input elements 210 that the user 104 may interact with to cause the remote access device 200 to perform predefined operations, such as locking/unlocking a door, or sounding a panic alarm.

The controller 202 includes one or more integrated chips having hardware specially configured to perform the operations described herein. The controller 202 includes a central processing unit and memory (e.g., read-only memory, random access memory) storing instructions that cause the controller 202 to perform as described herein. The controller 202 may include peripheral integrated circuit element(s), an application-specific integrated circuit or other integrated circuit, a digital signal processor, electronic or logic circuitry such as discrete element circuit, a programmable logic device or gate array such as a field programmable gate array, a programmable logic array, or other such devices. Examples of the controller 202 include the STM32 series or STM8 series microcontrollers manufactured by STMicroelectronics®.

The controller 202 is electrically communicatively coupled to the accelerometer 204. The accelerometer 204 detects acceleration forces exerted on the remote access device 200 along one or more axes of motion (e.g., x-axis, y-axis, z-axis). The acceleration forces detected are indicative of motion and changes in motion of the remote access device 200. The accelerometer 204 generates one or more measurement signals based on the acceleration detected and may output the signals generated to the controller 202. The signals generated by the accelerometer 204 may be outputted as analog signals or digital signals.

The accelerometer 204 may include hardware registers that control the behavior or operations of the accelerometer 204. The accelerometer 204 may further include or have access to memory storing various settings to be implemented in the hardware registers in response to detecting motion characteristics of the remote access device 200 that correspond to changes in motion state. For instance, the accelerometer 204 may implement settings in hardware registers defining certain thresholds and features to be enabled/disabled as a result of detecting a motion state or a change in motion state of the remote access device 200, as described below with respect to FIGS. 4, 5, 6, and 7. In some embodiments, the accelerometer 204 may cause the controller 202 and/or the transmitter 206 to implement defined settings as a result of detecting a motion state or a change in motion state of the remote access device 200.

The controller 202 receives the signals from the accelerometer 204 and determines whether to adjust an operating mode of the transmitter 206 based on the measurement signals received. In some embodiments, the controller 202 causes an adjustment in the operating mode of the transmitter 206 as a result of determining that a change in a motion state of the remote access device 200 has occurred. For example, at a first time the controller 202 may determine that the remote access device 200 is in the first motion state based on the signals received from the accelerometer 204 indicating motion characteristics of the remote access device 200 being less than a threshold. At a second time after the first time, the controller 202 may determine that the remote access device 200 has changed to a second motion state based on the signals received from the accelerometer 204 indicating motion characteristics of the remote access device 200 exceeding the threshold. As a result of determining a change in a motion state of the remote access device 200, the controller 202 may send a signal to the transmitter 206 causing the transmitter 206 to transition to a different operating mode in some embodiments. In some embodiments, the accelerometer 204 may send a signal to the transmitter 206 causing the transmitter 206 to transition to a different operating mode.

In FIG. 2 and at least some of the descriptions herein, the controller 202 is depicted and described as being a separate device than the accelerometer 204; however, the scope of the present disclosure is not limited to such a configuration and should not be construed as such. In some embodiments, the accelerometer 204 and the controller 202 may be included in the same device—for example, the accelerometer 204 and the controller 202 may be packaged in the same device. In some embodiments, a portion of the controller 202 may be included as part of the accelerometer 204 and another portion of the controller 202 may be separate from the accelerometer. In some embodiments, the controller 202 may be a device separate from the accelerometer 204. For instance, the controller 202 may be an integrated circuit that has a package that is different than a package of the accelerometer 204. The wireless transmitter 206 is a short-range transmitter configured to transmit wireless communication signals. In some embodiments, the transmitter 206 may include a radio transmitter that transmits radio frequency (RF) signals in a range of 10 to 65 feet. In some embodiments, the transmitter 206 may include a near-field communication (NFC) transmitter that transmits wireless signals in a range of less than five feet. The transmitter 206 may modulate characteristics of the carrier wave of the wireless signals transmitted according to various methods, such as amplitude modulation, shift key modulation, frequency modulation, or other similar known modulation methods.

The wireless transmitter 206 may operate by default in a low-power mode in which the wireless transmitter 206 does not transmit wireless communication signals. For instance, the wireless transmitter 206 may be configured to operate in a non-transmitting mode unless one or more particular signals are received from the controller 202. In response to receiving the one or more particular signals from the controller 202, the wireless transmitter 202 may then transition to a transmitting mode in which the transmitter 202 transmits wireless communication signals. After a defined period of operating in the transmitting mode, the wireless transmitter 206 then transitions back to the non-transmitting mode until the one or more particular signals are again received from the controller 202. The defined period may be a defined period of time, a defined number of periods of signal transmission, or a period in which the one or more particular signals are received from the controller 202.

The wireless transmitter 206 may have one or more inputs connected to corresponding outputs of the controller 202 for receiving signals therefrom. The controller 202 may, for example, communicate with the wireless transmitter 206 via one or more interfaces according to a communication protocol such as the inter-integrated circuit (I2C) protocol. The controller 202 may send control signals to the corresponding inputs of the wireless transmitter 206 that control the operating mode of the wireless transmitter 206. The wireless transmitter 206 may also have an input for receiving information indicating a set of codes to be wirelessly transmitted.

The remote access device 200 may include memory storing sets of codes for transmission by the wireless transmitter 206. The stored codes may include security codes (e.g., rolling codes, hopping codes) that the remote access device 200 cycles through to prevent replay attacks. For instance, the controller 202 may provide a first security code and a function code to the wireless transmitter 206 in response to detecting a first change in motion states. The controller 202 may provide a second security code and a function code to the wireless transmitter 206 in response to detecting a second change in motion states. The controller 202 may provide a third security code and a function code to the wireless transmitter 206 in response to detecting a third change in motion states.

The stored codes may include function codes that indicate a function to be performed by the physical object 102 receiving the wireless communication from the wireless transmitter 206. Wireless communication transmissions by the wireless transmitter 206 may include a function code and a security code. In some embodiments, the memory may be memory 212 included in or communicatively coupled to the controller 202. The memory 212 may store security codes, function codes, and information regarding settings for hardware registers of the controller 202 and/or the accelerometer 204. As described below, implementation of the settings may enable/disable various interrupts and set thresholds for initiating corresponding interrupts. In some embodiments, the wireless transmitter 206 may include or have coupled thereto memory storing security codes.

In response to detecting a change in the motion state of the remote access device 200, the controller 202 may send or otherwise indicate a defined function code to the transmitter 206 for transmission to the physical object 102. For instance, the controller 202 may send a function code for unlocking the physical object 102 in response to detecting the change in the motion state of the remote access device 200. The controller 202 may also send a function code to the wireless transmitter 206 corresponding to an input received from one of the user input elements 210. As one example, the controller 202 may send a function code to the wireless transmitter 206 for locking the physical object 102 in response to a user interaction with a corresponding one of the user input elements 210.

Figure 3:
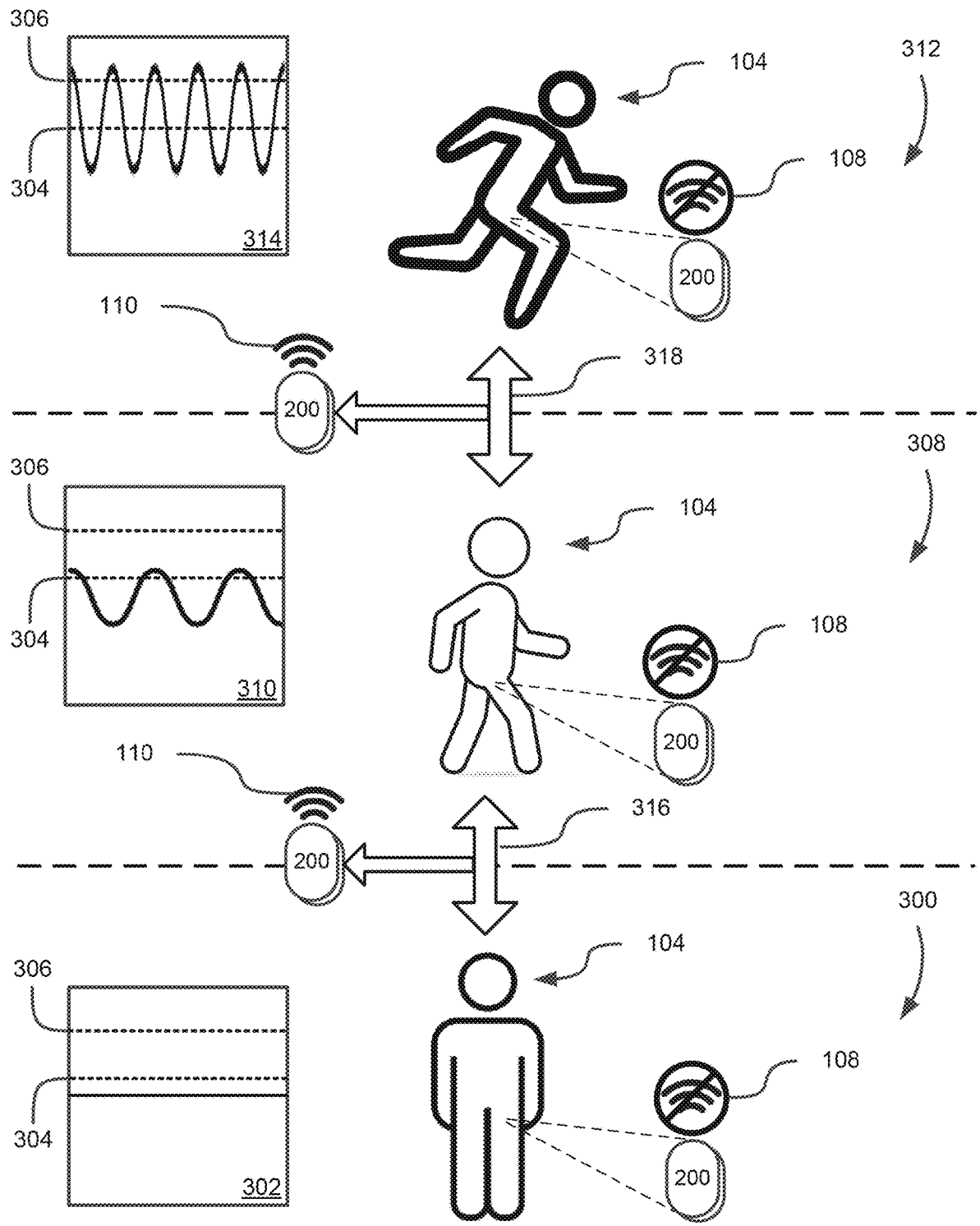
FIG. 3 is an environment in which the remote access device operates relative to three states of motion.

FIG. 3 shows a diagram of several motion states of the remote access device 200 and corresponding operating modes thereof according to one or more embodiments. The motion state of the remote access device 200 corresponds to the characteristics of motion detected by the accelerometer 204. As described herein, the accelerometer 204 generates measurement signals representative of the motion, or lack thereof, of the user 104. The motion characteristics of the remote access device 200 may be a motion intensity and/or frequency of motion corresponding to the measurement signals by the accelerometer 204. For instance, the motion intensity may be the amplitude of the measurement signals provided by the accelerometer 204. Motion intensity may correspond to a magnitude of the downward or translational acceleration forces measured by the accelerometer 204 within a period of time. As another example, the frequency of motion may be the number of cycles (e.g., peak values) of motion occurring within a predetermined period of time or the inverse of a time period between peak values (e.g., local maxima, local minima) of motion detected by the accelerometer 204.

The remote access device 200 may be in a first motion state 300 in which the remote access device 200 is at rest or has motion characteristics 302 detected as being below a first threshold 304. In the first motion state 300, for example, the user 104 may be standing or sitting with the remote access device 200 in a pocket, a bag, or the user's hand. In the first motion state 300, the accelerometer 204 generates measurement signals with characteristics 302 determined as having frequency values or amplitude values below the first motion threshold 304. In the first motion state 300, the remote access device 200 is in the first operating mode 108—that is, a non-transmitting mode in which the transmitter 206 is not transmitting wireless signals. In some embodiments, the non-transmitting mode is a mode in which the wireless transmitter 206 is off and does not receive power from the battery 208. In some embodiments, the non-transmitting mode is a mode in which the wireless transmitter 206 is on (i.e., receives power from the battery 208) and does not transmit wireless signals.

The remote access device 200 may be in a second motion state 308 in which the remote access device 200 has motion characteristics 310 detected as being equal to or exceeding the first threshold 304 and being below a second threshold 306. In the second motion state 308, for example, the user 104 may be walking with the remote access device 200 in a pocket, a bag, or the user's hand. In the second motion state 308, the accelerometer 204 generates measurement signals with characteristics 310 determined as having frequency values or amplitude values at or above the first motion threshold 304 and below the second motion threshold 306. In the second motion state 308, the remote access device 200 is in the first operating mode 108.

The first motion threshold 304 and the second motion threshold 306 shown in FIG. 3 correspond to amplitude of measurement signals by the accelerometer 204; however, the first motion threshold 304 and the second motion threshold 306 may correspond to other thresholds. For example, the first threshold 304 and the second threshold 306 may be frequency thresholds. Moreover, the value of the first threshold 304 and the value of the second threshold 306 may change based on settings implemented by the remote access device described below.

The remote access device 200 may be in a third motion state 312 in which the remote access device 200 has motion characteristics 314 detected as being equal to or exceeding the second motion threshold 306 and exceeding the first motion threshold 304. In the third motion state 312, for example, the user 104 may be running or walking fast with the remote access device 200 in a pocket, a bag, or the user's hand. In the third motion state 312, the accelerometer 204 generates measurement signals with characteristics 314 determined as having frequency values or amplitude values equal to or exceeding the second motion threshold 306 and exceeding the first motion threshold 304. In the third motion state 312, the remote access device 200 is in the first operating mode 108.

The remote access device 200 may transition from the first operating mode 108 to the second operating mode 110 in response to detecting a change between two states of motion. In particular, in response to detecting a change 316 between the first motion state 300 and the second motion state 308, the remote access device 200 may begin transmitting wireless signals in the second operating mode 110 for a defined period. For instance, the remote access device 200 may transmit a defined number of packets encoding a function code and a security code for accessing the physical object 102. As another example, the remote access device 200 may transmit wireless signals encoding the function code and the security code for a defined period of time (e.g., 10 milliseconds). After the defined period, the remote access device 200 may transition from the second operating mode 110 to the first operating mode 108. Thereafter, the remote access device 200 may continue operating in the first operating mode 108 until another change in the motion state is detected.

The remote access device 200 may transition, in response to detecting a change 318 between the second motion state 308 and the third motion state 312, from the first operating mode 108 to the second operating mode 110 for the defined period. That is, the remote access device 200 may operate in the second operating mode 110 for the defined period of time in response to detecting the change 318 between the second motion state 308 and the third motion state 312. The remote access device 200 may transition from the first operating mode 108 to the second operating mode 110 also in response to detecting a change between the first motion state 300 and the third motion state 312.

The first threshold 304 and/or the second threshold 306 may be set according to information stored in the memory 212. For instance, the memory 212 may store information indicating values to be set for the first threshold 304 and/or the second threshold 306 in response to detecting corresponding changes in motion states. The values for the first threshold 304 and/or the second threshold 306 may be set to reduce latency and/or current consumption.

The remote access device 200 is described as detecting changes in motion states between three different motion states. However, the remote access device 200 is not limited thereto and may be configured to detect changes in motion states between more than three different motion states. Moreover, the thresholds for detecting changes in motion states may change in response to detecting a change between two motion states.

Figure 4:
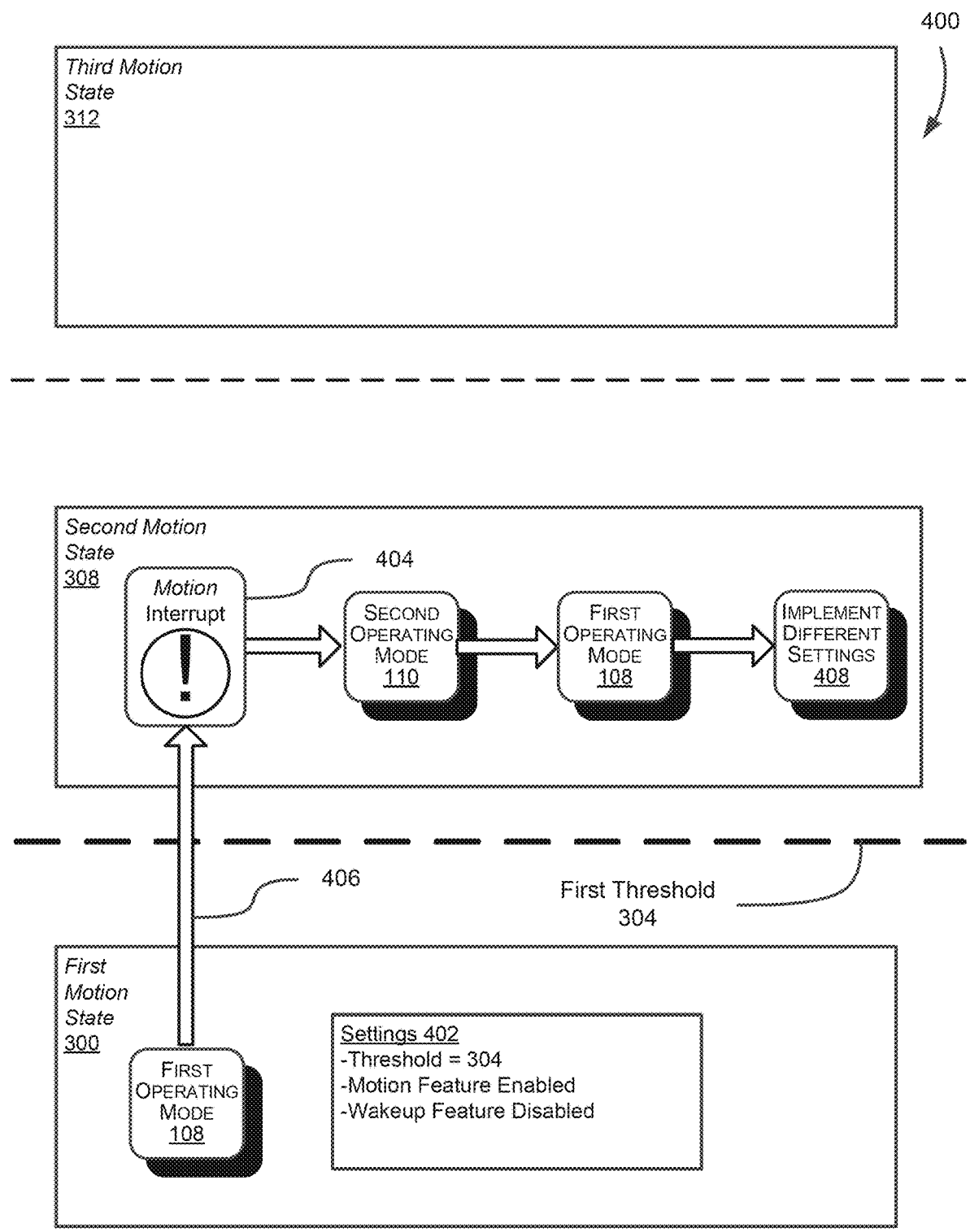
FIG. 4 is a diagram showing operation of the remote access device in response to transitioning between two states of motion.

FIG. 4 shows a diagram 400 of changes in operating state relative to a motion state of the remote access device 200 according to one or more embodiments. In the diagram 400, the remote access device 200 is detected to have motion characteristics below the first threshold 304 and thus is in the first motion state 300. The remote access device 200 is operating in the first operating mode 108 initially.

When the remote access device 200 is in the first motion state 300, the remote access device 200 operates according to settings 402 that define enabled features of the remote access device 200 and motion characteristic thresholds. The settings 402 are settings that are implemented in hardware registers of the accelerometer 204 that control the behavior or operations of the accelerometer 204. The settings 402 define that, when the remote access device is in the first motion state 300, the threshold is set to the first threshold 304, the motion feature is enabled, and the wakeup feature is disabled. Enablement of the motion feature causes the remote access device 200 to generate a hardware-based motion interrupt in response to detecting that the motion characteristics of the remote access device 200 exceed the first threshold 304. Due to the settings 402, motion characteristics that exceed the first threshold 304 may cause the remote access device 200 to initiate settings corresponding to the second motion state 308, as described below.

In response to detecting a motion state change 406 from the first motion state 300 to the second motion state 308, the controller 202 generates a motion interrupt 404. The motion state change 406 may be a change from a no-motion state (i.e., the accelerometer 204 is generating measurement signals below the first threshold 304) to a low motion state (i.e., the accelerometer 204 is generating measurement signals equal to or exceeding the first threshold 304 but not equal to or exceeding the second threshold 306). The accelerometer 204 may detect the motion state change 406 as a result of receiving a predetermined number of measurement samples within a given period of time that exceed the first threshold 304. Specifically, the remote access device 200 is detected, at a first time, to be in the first motion state 300. Then, at a time period after the first time, the accelerometer 204 receives a predetermined number of measurements that indicate motion characteristics equal to or exceeding the first threshold 304. The accelerometer 204, in response to receiving the predetermined number of measurements, generates the motion interrupt 404. In some embodiments, the motion interrupt 404 may be sent to the controller 202 and/or to the transmitter 206, causing the controller 202 and/or transmitter 206 to transition to a different state of operation, as described herein.

The motion interrupt 404 causes the remote access device 200 to transition to the second operating mode 110 for a defined period. After the conditions for the defined period are satisfied (e.g., the transmitter 206 has transmitted a defined number of packets), the remote access device 200 transitions back to the first operating mode 108. The remote access device 200 also implements 408 different settings than the settings 402 while in the second motion state 308. In particular, the remote access device 200 implements settings 502 described below.

Figure 5:
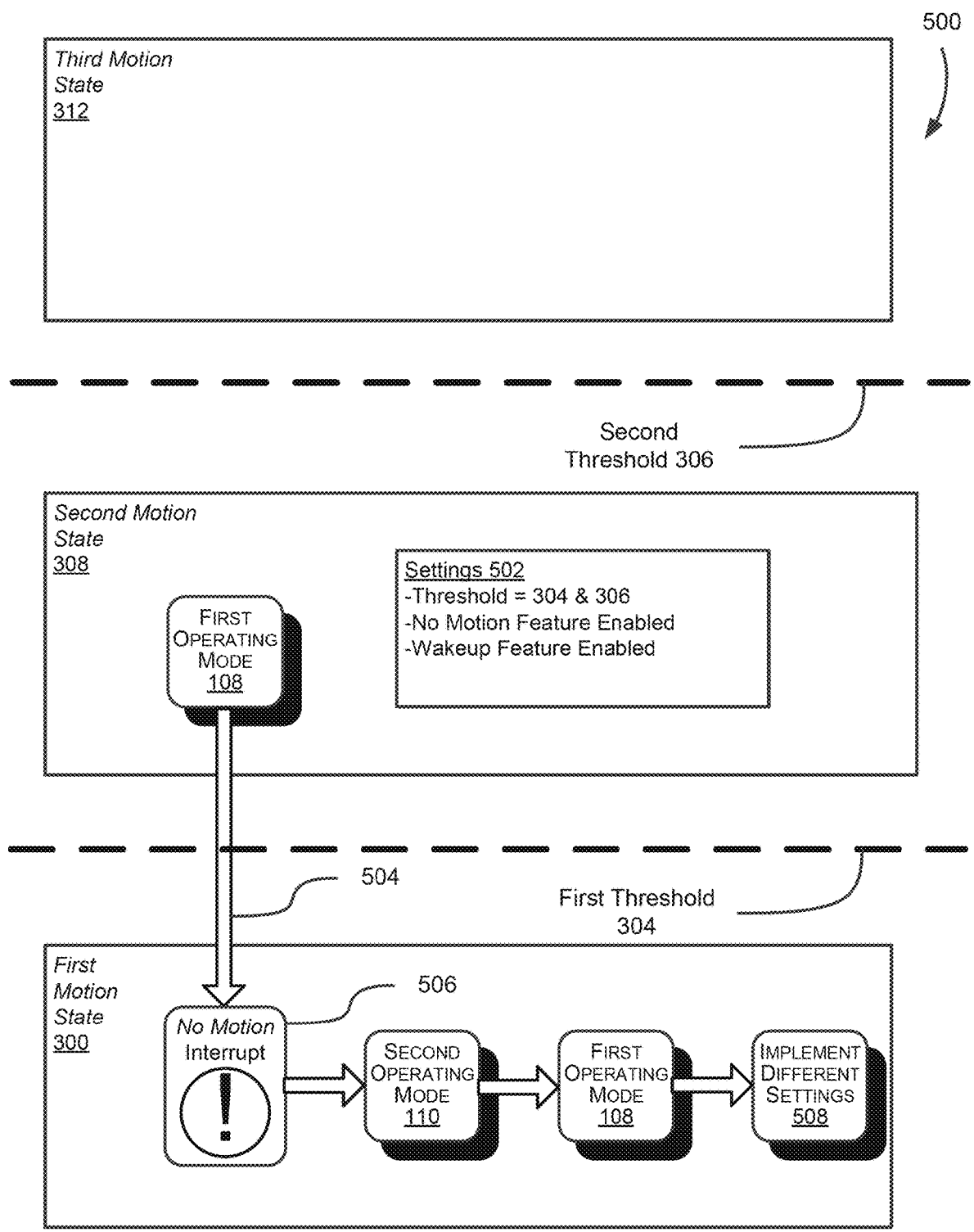
FIG. 5 is a diagram showing operation of the remote access device in response to transitioning between two states of motion.

FIG. 5 shows a diagram 500 of changes in operating state relative to a motion state of the remote access device 200 according to one or more embodiments. In the diagram 500, the remote access device 200 is initially operating in the first operating mode 108 subsequent to detecting the motion state change 406 discussed with respect to the diagram 400. In the diagram 500, the remote access device 200 is initially detected to have motion characteristics equal to or exceeding the first threshold 304 and below the second threshold 306.

When the remote access device 200 is in the second motion state 308 after detection of the change in motion 406, the remote access device operates according to settings 502 that define enabled features of the remote access device 200 and motion characteristic thresholds. The settings 502 define that, when the remote access device 200 is in the second motion state 308, the accelerometer 204 is to monitor whether the measurement signals exceed the second threshold 306 or are less than the first threshold 304. The settings 502 also define that the no-motion feature is enabled and the wakeup feature is enabled. Enablement of the no-motion feature causes the remote access device 200 to generate a hardware-based no-motion interrupt in response to detecting that the motion characteristics of the remote access device 200 are below the first threshold 304. Enablement of the wakeup feature causes the remote access device 200 to generate a hardware-based wakeup interrupt in response to detecting that the motion characteristics of the remote access device 200 exceed the second threshold 306.

In response to detecting a change in motion 504 from the second motion state 308 to the first motion state 300, the accelerometer 204 generates a no-motion interrupt 506. The change in motion 504 is, in particular, a change from a low motion state (i.e., remote access device 200 having motion characteristics between the first threshold 304 and the second threshold 306) to a no-motion state (i.e., remote access device 200 having motion characteristics below the first threshold 304). The accelerometer 204 may detect the change in motion 504 as a result of receiving a predetermined number of measurement samples within a given period of time that are below the first threshold 304. Specifically, the remote access device 200 is detected, at a first time, to be in the second motion state 308. Then, at a time period after the first time, the accelerometer 204 receives a predetermined number of measurements that indicate motion characteristics below the first threshold 304. The accelerometer 204, in response to receiving the predetermined number of measurements, generates the no-motion interrupt 506. In some embodiments, the no-motion interrupt 506 may be sent to the controller 202 and/or to the transmitter 206, causing the controller 202 and/or transmitter 206 to transition to a different state of operation, as described herein.

The no-motion interrupt 506 causes the remote access device 200 to transition to the second operating mode 110 for a defined period. After the conditions for the defined period are satisfied (e.g., the transmitter 206 has transmitted a defined number of packets), the remote access device 200 transitions back to the first operating mode 108. The remote access device 200 also implements 508 different settings than the settings 502 as a result of detecting the change in motion states 504. In particular, the remote access device 200 implements the settings 402 described above with respect to the diagram 400.

Figure 6:
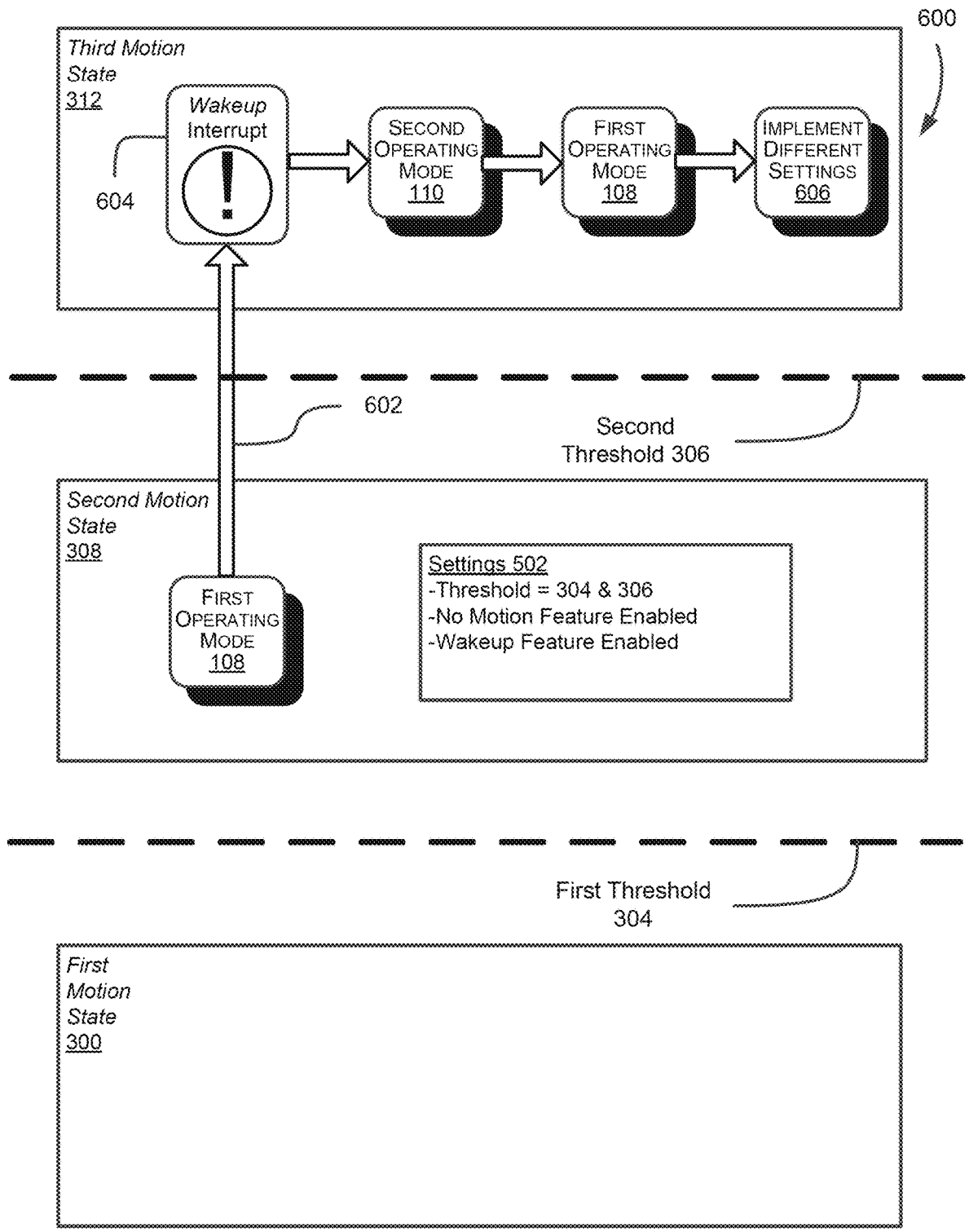
FIG. 6 is a diagram showing operation of the remote access device in response to transitioning between two states of motion.

FIG. 6 shows a diagram 600 of changes in operating state relative to a motion state of the remote access device 200 according to one or more embodiments. In the diagram 600, the remote access device 200 is initially operating in the first operating mode 108 subsequent to detecting the change in motion states 406 discussed with respect to the diagram 400. In the diagram 600, the remote access device 200 is initially in the second motion state 308 and detected to have motion characteristics equal to or exceeding the first threshold 304 and below the second threshold 306. When the remote access device 200 is in the second motion state 308, the remote access device operates according to the settings 502 described above with respect to the diagram 500.

In response to detecting a motion state change 602 from the second motion state 308 to the third motion state 312, the accelerometer 204 generates a wakeup interrupt 604. The motion state change 602 is a change from a low motion state (i.e., remote access device 200 having motion characteristics between the first threshold 304 and the second threshold 306) to a high motion state (i.e., remote access device 200 having motion characteristics equal to or exceeding the second threshold 306). The accelerometer 204 may detect the change in motion 602 as a result of receiving a predetermined number of measurement samples within a given period of time that exceed the second threshold 306. Specifically, the remote access device 200 is detected, at a first time, to be in the second motion state 308. Then, at a time period after the first time, the accelerometer 204 receives a predetermined number of measurements that indicate motion characteristics exceeding the second threshold 306. The accelerometer 204, in response to receiving the predetermined number of measurements, generates the wakeup interrupt 604. In some embodiments, the wakeup interrupt 604 may be sent to the controller 202 and/or to the transmitter 206, causing the controller 202 and/or transmitter 206 to transition to a different state of operation, as described herein.

The wakeup interrupt 604 causes the remote access device 200 to transition to the second operating mode 110 for a defined period. After the conditions for the defined period are satisfied (e.g., the transmitter 206 has transmitted a defined number of packets), the remote access device 200 transitions back to the first operating mode 108. The remote access device 200 also implements 606 different settings than the settings 502 in response to detecting the motion state change 602. In particular, the remote access device 200 implements settings 702 described below with respect to FIG. 7.

Figure 7:
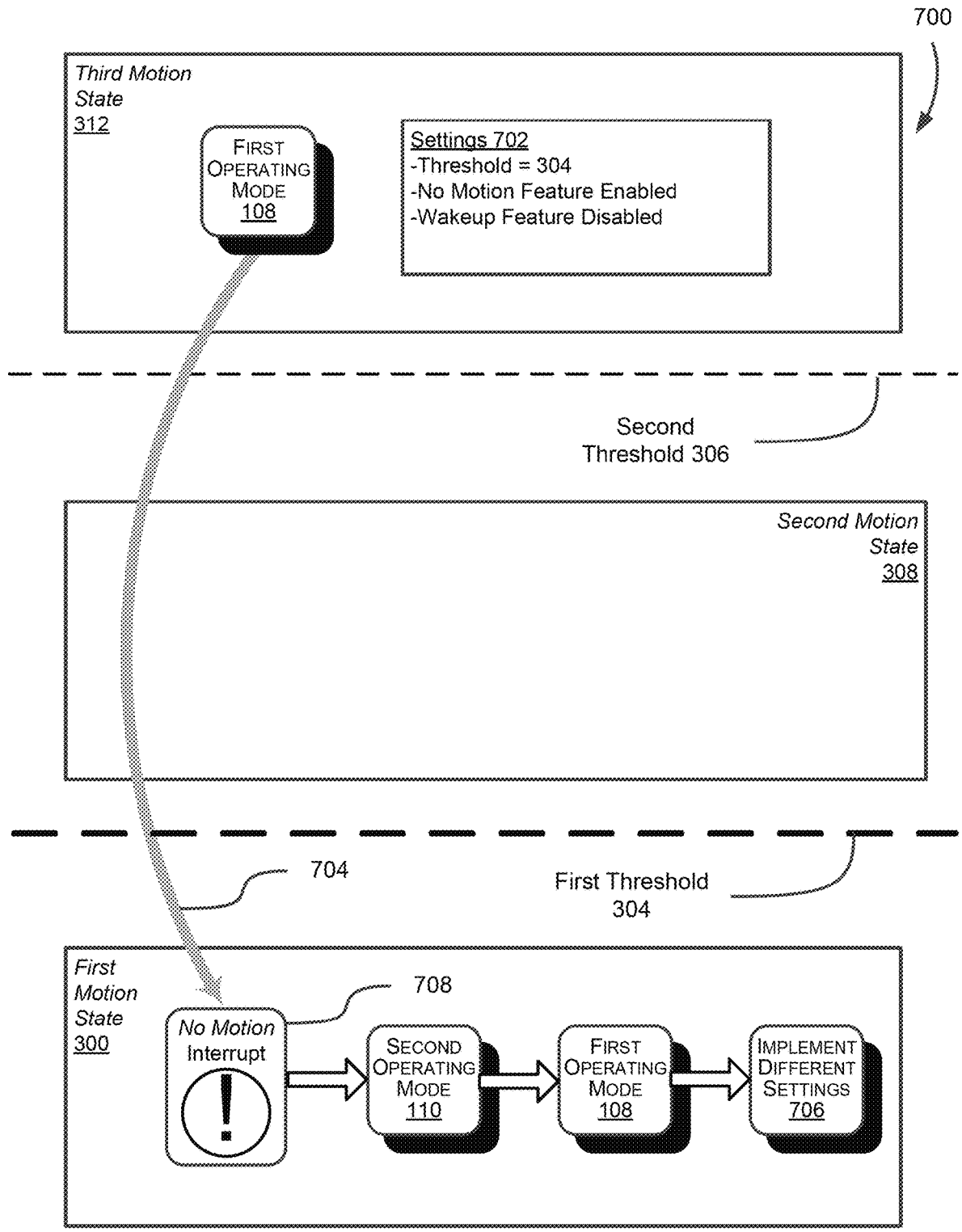
FIG. 7 is a diagram showing operation of the remote access device in response to transitioning between two states of motion.

FIG. 7 shows a diagram 700 of changes in operating state relative to a motion state of the remote access device 200 according to one or more embodiments. In the diagram 700, the remote access device 200 is initially operating in the first operating mode 108 subsequent to detecting the motion state change 602 discussed with respect to the diagram 600. In the diagram 700, the remote access device 200 is initially detected to have motion characteristics equal to or exceeding the second threshold 306 and is thus in the third motion state 312.

When the remote access device 200 is in the third motion state 312 after detection of the motion state change 602, the remote access device operates according to settings 702 that define enabled features of the remote access device 200 and motion characteristic thresholds. The settings 702 define that the accelerometer 204 is to monitor whether the measurement signals are less than the first threshold 304. The settings 702 also define that the no-motion feature is enabled and the wakeup feature is disabled. Enablement of the no-motion feature causes the remote access device 200 to generate a hardware-based no-motion interrupt in response to detecting that the motion characteristics of the remote access device 200 are below the first threshold 304. As a result of the wakeup feature being disabled when the settings 702 are being implemented, the accelerometer 204 may not provide a notification or cause a change in state in response to detecting that the measurement signals are above the second threshold 306.

In response to detecting a motion state change 704 to the first motion state 300, the accelerometer 204 generates a no-motion interrupt 708. In some embodiments, the no-motion interrupt 708 may be sent to the controller 202 and/or to the transmitter 206, causing the controller 202 and/or transmitter 206 to transition to a different state of operation, as described herein. The accelerometer 204 may detect the motion state change 704 as a result of receiving a predetermined number of measurement samples within a given period of time that are below the first threshold 304. Specifically, the remote access device 200 is detected, at a first time, to be in the third motion state 312. Then, at a time period after the first time, the accelerometer 204 receives a predetermined number of measurements that indicate motion characteristics below the first threshold 304. The accelerometer 204, in response to receiving the predetermined number of measurements, generates the no-motion interrupt 708.

The no-motion interrupt 708 causes the remote access device 200 to transition to the second operating mode 110 for a defined period. After the conditions for the defined period are satisfied (e.g., the transmitter 206 has transmitted a defined number of packets), the remote access device 200 transitions back to the first operating mode 108. The remote access device 200 also implements 706 different settings than the settings 702 as a result of detecting the motion state change 704. In particular, the remote access device 200 implements the settings 402 described above with respect to the diagram 400.

In some embodiments, the remote access device 200 may operate according to the changes in operating state depicted in the diagram 700 as a result of a transition from the third motion state 312 to the second motion state 308. For instance, the threshold in the settings 702 may be set to the second threshold 306 instead of the first threshold 304. In such an embodiment, the remote access device 200 may, as a result of detecting motion characteristics below the second threshold 306, generate the no-motion interrupt 708, then transition to the second operating mode 110, then the first operating mode 108, and then implement different settings, as described elsewhere herein.

In some embodiments, the first threshold 304 and/or the second threshold 306 may be adjustable via firmware updates or user interaction. For instance, a user may interact with the remote access device 200 to adjust values for the thresholds 304 and/or 306 during a setup period via a serial communication connection or a wireless communication connection.

Figure 8:
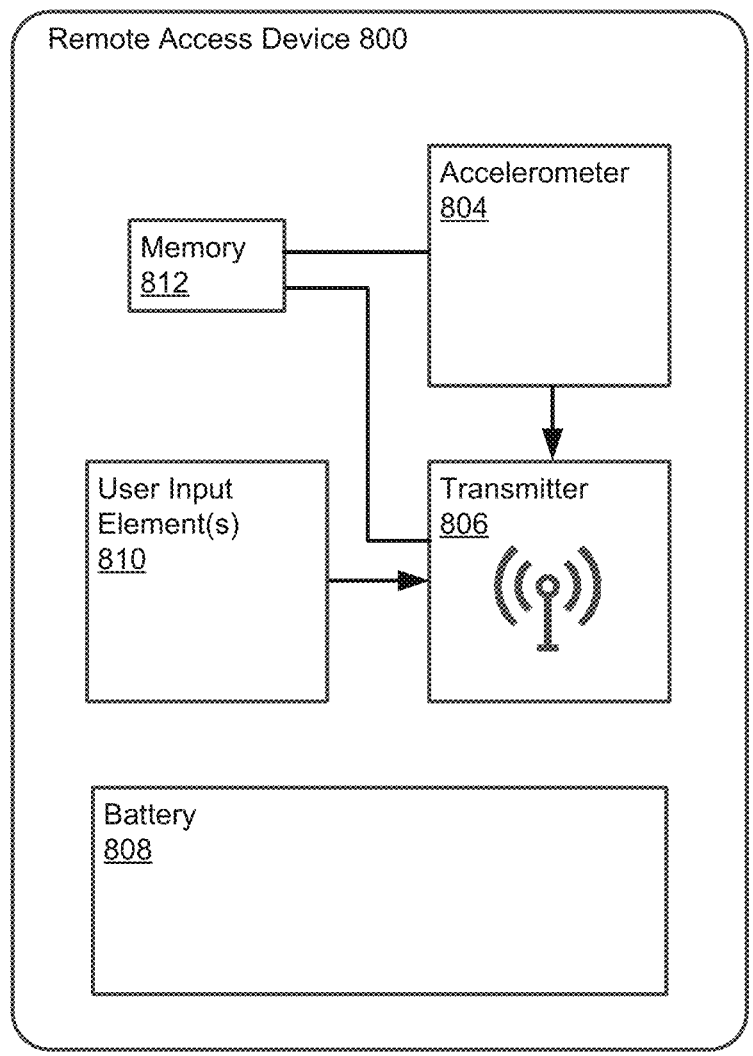
FIG. 8 is a block diagram of the remote access device of FIG. 1 according to a second embodiment.

In some embodiments, the remote access device 200 may not include a separate controller 202. FIG. 8, for instance, shows a remote access device 800 that does not include a separate controller 202. The remote access device 800 includes an accelerometer 804, a wireless transmitter 806, and an installable and removable battery 808. The remote access device 800 may also include one or more user input elements 810 as described above. The remote access device may also include memory 812 communicatively coupled with the accelerometer 804 and/or the wireless transmitter 806. The memory 812 may store security codes, function codes, and information regarding settings for hardware registers of the accelerometer 804 and/or the wireless transmitter 806.

The accelerometer 804 and wireless transmitter 806 operate in a manner similar to the accelerometer 204 and the wireless transmitter 806 except that the accelerometer 804 and/or the wireless transmitter 806 may include control circuitry for causing the remote access device 800 to perform like the remote access device 200. For instance, the accelerometer 804 may include control circuitry configured to send signals to the wireless transmitter 806 based on measurements by the accelerometer 804, as described above with respect to the remote access device 200. As another example, the wireless transmitter 806 may include control circuitry configured to cause the wireless transmitter 806 to operate as described above with respect to the remote access device 200 based on measurement signals received from the accelerometer 804.

Figure 9:
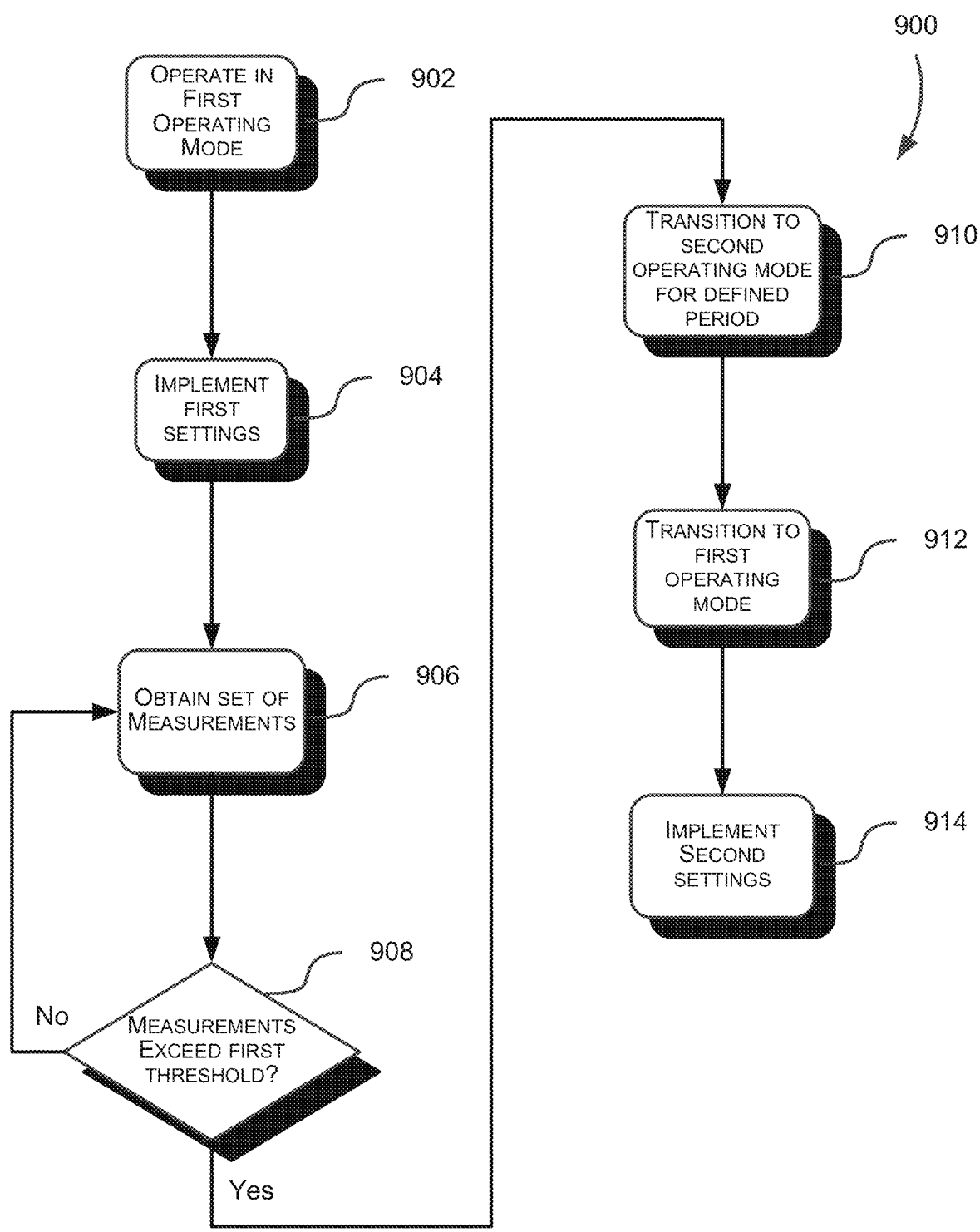
FIG. 9 is a method of operation to transition an operating mode of the remote access device in response to detecting changes in motion states.

FIG. 9 shows a method 900 of operation for the remote access device 200 or 800 according to one or more embodiments. The method 900 may be performed by one or more components of the remote access device 200 or the remote access device 800, such as the controller 202, the accelerometer 804, or the transmitter 806. The method 900 begins by operating 902 the wireless transmitter 206 in the first operating mode 108. The controller 202, for example, may send a signal to the wireless transmitter 206 that causes the wireless transmitter 206 not to transmit wireless signals. As another example, the wireless transmitter 206 may transition to the first operating mode 108 after operating in the second operating mode 110 for a defined period. The wireless transmitter 206 may be operated 902 in the first operating mode 108 subsequent to operating in the second operating mode 110 for the defined period, as described herein.

The method 900 includes implementing 904 first settings for the controller 202 or control circuitry of the accelerometer 804 or the wireless transmitter 806. In particular, the settings 402 are implemented for the accelerometer 204, as described with respect to FIG. 4. For instance, hardware registers of the accelerometer 204 may be configured with values causing the motion interrupt feature to be enabled, the wakeup feature to be disabled, and the motion threshold for the motion interrupt feature to be set to a value corresponding to the first threshold 304.

The method 900 proceeds to obtaining 906 a first set of measurements indicative of motion characteristics of the remote access device 200 or 800 during a first time period. The first set of measurements may be obtained from the accelerometer 204 or the accelerometer 804. The first set of measurements may indicate acceleration magnitudes measured by the accelerometer 204 or 804 in one or more directions over a period of time. Thereafter, the method 900 includes determining 908 whether the measurements in the first set of measurements exceed the first threshold 304. Determining 908 may include determining whether the measurements in the first set of measurements exceed the first threshold 304 for a certain period of time. For instance, it may be determined in 908 whether a predetermined number of consecutive measurements obtained from the accelerometer 204 exceeds the first threshold 304. As another example, determining 908 may include determining whether an average or a mean of the first set of measurements exceeds the first threshold 304. If not, the method 900 returns to obtain 906 an additional set of measurements.

If the first set of measurements exceeds the first threshold 304, the method 900 proceeds to transitioning 910 to the second operating mode 110 for a defined period. In particular, the wireless transmitter 206 is controlled to transmit wireless signals for providing access to the physical object 102 for a defined period. The defined period may be a defined period of time or a period sufficient for a defined number of data packets to be transmitted. The defined number of data packets may be a single data packet or a plurality of data packets. Transitioning 910 may include generating the motion interrupt 404 described above with respect to FIG. 4. Transitioning 910 to the second operating mode 110 may include sending, by the controller 202, a control signal to the wireless transmitter 206 that causes the wireless transmitter 206 to operate in the second operating mode 110.

After operating in the second mode 110 for the defined period, the method 900 proceeds to transitioning 912 back to the first operating mode 108. Specifically, after the wireless transmitter 206 is operated in the second operating mode 110 for the defined period, the wireless transmitter 206 stops transmitting wireless signals for providing access to the physical object 102. In connection with transitioning 912 to the first operating mode 108, the controller 202 may stop sending the control signal to the wireless transmitter 206 or the wireless transmitter 206 may determine that it has fulfilled the conditions for the defined period.

Then, the method 900 proceeds to implementing 914 second settings for the accelerometer 204 or the wireless transmitter 806. In particular, the settings 502 discussed with respect to FIGS. 5 and 6 are implemented for the accelerometer 204 or the control circuitry. For instance, hardware registers of the accelerometer 204 may be configured with values causing the no-motion feature and the wakeup feature to be enabled, the no-motion threshold for the no-motion interrupt feature to be set to a value corresponding to the first threshold 304, and the wakeup threshold for the wakeup interrupt feature to be set to a value corresponding to the second threshold 306.

Figure 10:
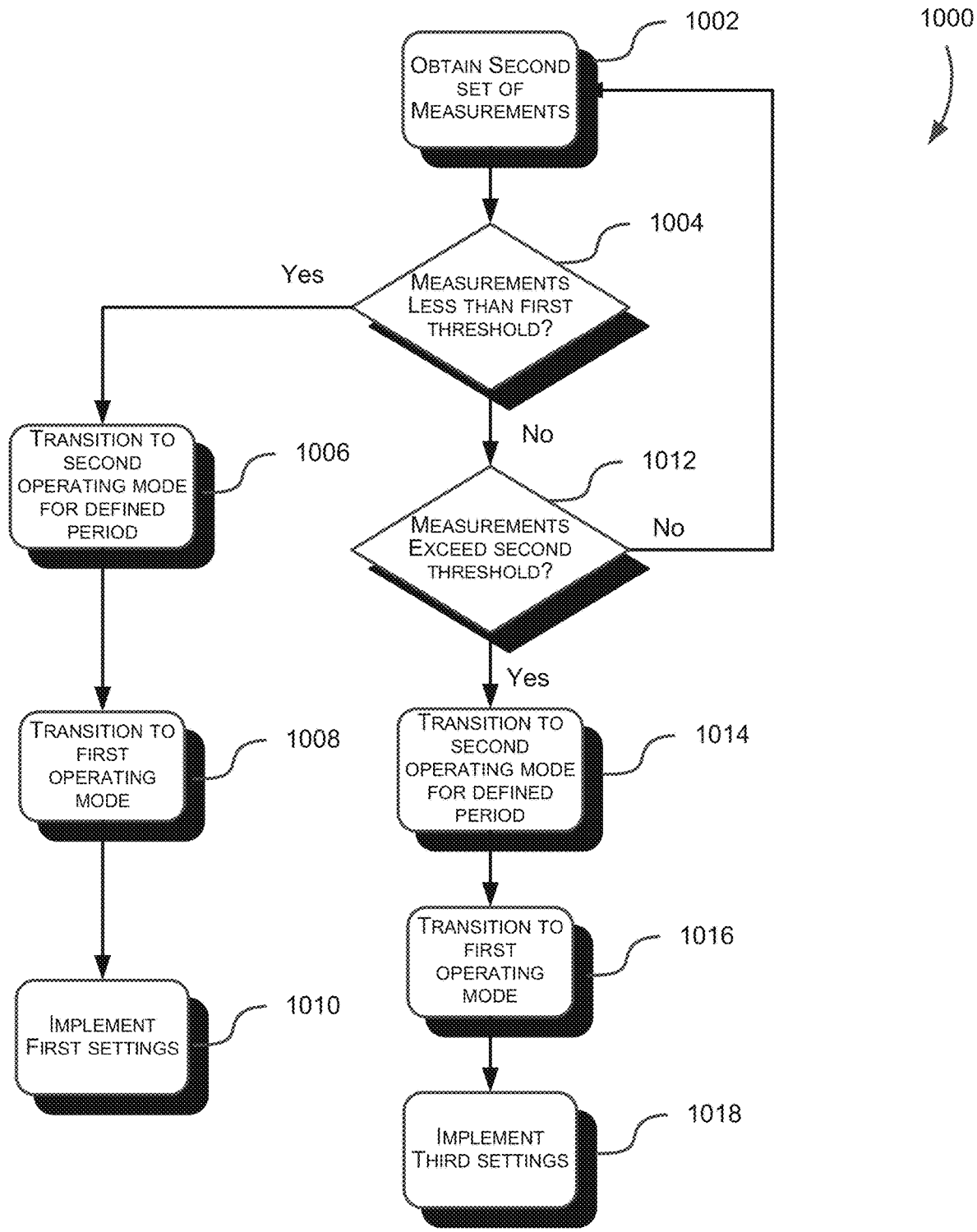
FIG. 10 is a method of operation to transition the operating mode of the remote access device in response to detecting changes in motion states.

FIG. 10 shows a method 1000 of operation for the remote access device 200 or 800 according to one or more embodiments. The method 1000 may be performed by one or more components of the remote access device 200 or the remote access device 800, such as the controller 202, the accelerometer 804, or the transmitter 806. The method 1000 may be performed when the remote access device 200 is implementing 914 the settings 502 in the method 900, as described above. At the beginning of the method 1000, the remote access device 200 or 800 is operating in the first operating mode 108. The method 1000 begins by obtaining 1002 a set of measurements indicative of motion characteristics of the remote access device 200 or 800. The set of measurements may be obtained as described above with respect to 906 of the method 900 and elsewhere herein.

Thereafter, the method 1000 includes determining 1004 whether measurements in the set of measurements obtained in 1002 are less than the first threshold 304. Determining 1004 may include determining whether the set of measurements are less than the first threshold 304 for a certain period of time. For instance, the accelerometer 204 may determine whether a predetermined number of consecutive measurements are less than the first threshold 304. As another example, determining 908 may include determining whether an average or a mean of the set of measurements obtained in 1002 are less than the first threshold 304.

If so, the method 1000 proceeds to transitioning 1006 to the second operating mode 110 for a defined period of time. Transitioning 1006 to the second operating mode 110 may include generating the no-motion interrupt 504 and is otherwise similar to 910 of the method 900. Then, the method 1000 involves transitioning 1008 back to the first operating mode 108. Transitioning to the first operating mode 108 is similar to 912 of the method 900 and elsewhere herein, so further description thereof is omitted. The method 1000 includes implementing 1010 the first settings (i.e., settings 402), as described in 904 of the method 900 and elsewhere herein.

If, in 1004, it is determined that the set of measurements obtained in 1002 are not less than the first threshold 304, then the method 1000 proceeds to determine 1012 whether the set of measurements are equal to or exceed the second threshold 306. If the set of measurements do not exceed the second threshold 306, then the method 1000 proceeds to obtaining 1002 another set of measurements.

If it is determined in 1012 that the set of measurements are equal to or exceed the second threshold 306, then the method 1000 proceeds to transitioning 1014 to the second operating mode 110 for a defined period. Transitioning 1014 to the second operating mode 110 may include generating the wakeup interrupt 604, as described with respect to FIG. 6 and elsewhere herein. Transitioning 1014 to the second operating mode 108 is otherwise similar to 910 of the method 900. Then, the method 1000 involves transitioning 1016 back to the first operating mode 108, as described in 912 of the method 900.

The method 1000 further includes implementing 1018 third settings for the accelerometer 204 and/or the wireless transmitter 206. In particular, the settings 702 are implemented for the accelerometer 204 or control circuitry, as described with respect to FIG. 7. For instance, hardware registers of the accelerometer 204 may be configured with values causing the no-motion interrupt feature to be enabled, the wakeup feature to be disabled, and the motion threshold for the motion interrupt feature to be set to a value corresponding to the first threshold 304.

Figure 11:
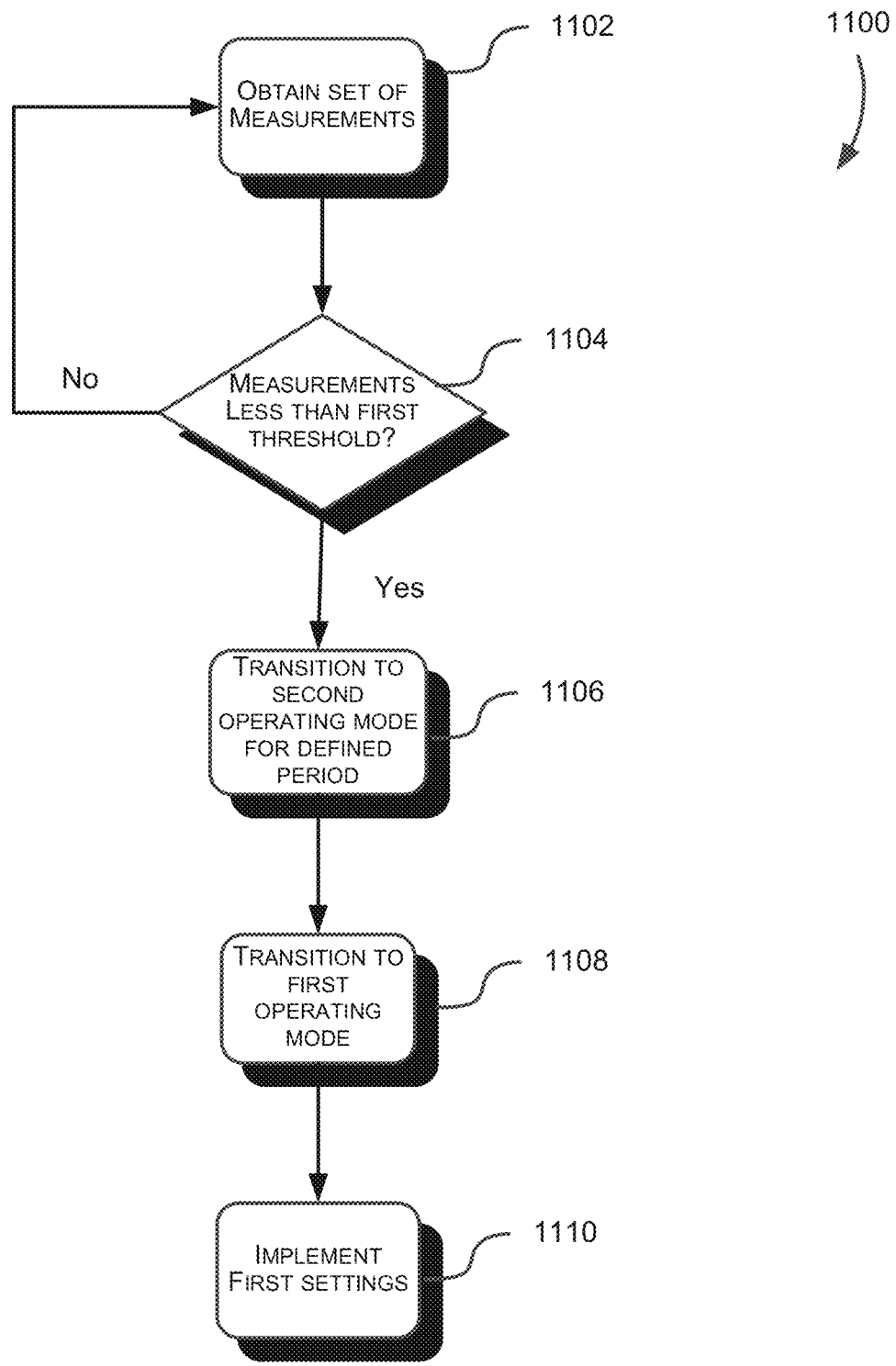
FIG. 11 is a method of operation to transition the operating mode of the remote access device in response to detecting changes in motion states.

FIG. 11 shows a method 1100 of operation for the remote access device 200 or 800 according to one or more embodiments. The method 1100 may be performed by one or more components of the remote access device 200 or the remote access device 800, such as the controller 802, the accelerometer 804, or the transmitter 806. At the beginning of the method 1100, the remote access device 200 or 800 is configured to operate according to the settings 702—for instance, as a result of implementing 1018 the third settings as described with respect to FIG. 10. At the beginning of the method 1100, the wireless transmitter 206 is operating in the first operating mode 108.

In the method 1100, a set of measurements are obtained 1102 as described with respect to 906 of FIG. 9. Then, the method 1100 includes determining 1104 whether the measurements are less than the first threshold 304. If not, the remote access device 200 proceeds to obtain 1102 another set of measurements. If, on the other hand, the set of measurements is less than the first threshold 304, then the method 1100 proceeds to transitioning 1106 the wireless transmitter 206 to operate in the second operating mode 110 for a defined period of time. Transitioning 1106 may include generating the no-motion interrupt 708, as described with respect to FIG. 7. Transitioning 1106 may be similar to 910 of the method 900 so further description thereof is omitted. Then, the method 1100 involves transitioning 1108 back to the first operating mode 108. Transitioning 1108 to the first operating mode 108 is similar to 912 of the method 900 and elsewhere herein, so further description thereof is omitted. The method 1100 further includes implementing 1110 the first settings (i.e., settings 402), as described in 904 of the method 900 and elsewhere herein.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A remote access device, comprising:
a wireless transmitter; and
an accelerometer;
the remote access device being configured to:
cause the wireless transmitter to transition between a first operating mode and a second operating mode in response to signals generated by the accelerometer indicating a first change in motion states of the remote access device between a first motion state and a second motion state,
cause the wireless transmitter to transition between the first operating mode and the second operating mode in response to signals generated by the accelerometer indicating a second change in motion states of the remote access device between the first motion state and a third motion state, and
cause the wireless transmitter to transition between the first operating mode and the second operating mode in response to signals generated by the accelerometer indicating a third change in motion states of the remote access device between the second motion state and the third motion state.

2. The remote access device of claim 1, wherein the first motion state is a motionless state, the second motion state is a low motion state below a given threshold, and the third motion state is a high motion state above the given threshold.

3. The remote access device of claim 2, wherein the accelerometer is configured to detect the second motion state by detecting that values of the signals exceed a first threshold and are less than a second threshold, and the accelerometer is configured to detect the third motion state by detecting that values of the signals generated by the accelerometer exceed the first threshold and the second threshold.

4. The remote access device of claim 1, wherein the first change in motion states corresponds to a transition between the first motion state and the second motion state across a first motion threshold, the second change in motion states corresponds to a transition between the first motion state and the third motion state across a second motion threshold, and the third change in motion states corresponds to a transition between the second motion state and the third motion state across the first motion threshold and the second motion threshold.

5. The remote access device of claim 1, wherein the accelerometer is configured to generate one or more hardware interrupts in response to detecting the first change in motion states, in response to detecting the second change in motion states, and in response to detecting the third change in motion states.

6. The remote access device of claim 5, further comprising:
a controller communicatively coupled to the wireless transmitter and the accelerometer, the controller configured to provide a security code and a function code to the wireless transmitter for transmission in connection with the one or more hardware interrupts.

7. The remote access device of claim 1, wherein the wireless transmitter is configured to not transmit wireless signals during the first operating mode and transmit wireless signals during the second operating mode.

8. The remote access device of claim 1, wherein the wireless transmitter operates in the first operating mode, transitions to the second operating mode in response to receiving an interrupt signal, and transitions from the second operating mode to the first operating mode after transmitting signals for a defined period.

9. The remote access device of claim 1, further comprising a controller communicatively coupled to the accelerometer, the controller configured to determine an occurrence of a change in motion states as a result of:
receipt, at a first time, of a first signal from the accelerometer that indicate motion characteristics of the remote access device are within a first defined range; and
receipt, in a time period subsequent to the first time, of a plurality of signals from the accelerometer that indicate motion characteristics of the remote access device are within a second defined range different than the first defined range.

10. The remote access device of claim 1, wherein the accelerometer is further configured to:
implement, in response to detection that the signals indicate the first change in motion states, first settings for a set of hardware registers of the accelerometer,
implement, in response to detection that the signals indicate the second change in motion states, second settings for the set of hardware registers of the accelerometer, and
implement, in response to detection of the signals indicating the third change in motion states, third settings for the set of hardware registers of the accelerometer.

11. A remote access device, comprising:
a wireless transmitter configured to operate in a first operating mode and in a second operating mode; and
an accelerometer configured to:
detect a first change in motion states of the remote access device between a first motion state and a second motion state, detect a second change in motion states of the remote access device between the second motion state and a third motion state, detect a third change in motion states of the remote access device between the first motion state and the third motion state, and generate, in response to detecting any of the first change in motion states, the second change in motion states, and the third change in motion states, a hardware interrupt that causes the wireless transmitter to transition from the first operating mode to the second operating mode.

12. The remote access device of claim 11, wherein the first motion state is a state in which the remote access device is motionless, the second motion state is a state in which the remote access device is moving with a low motion intensity below a defined threshold, and the third motion state is a state in which the remote access device is moving with a high motion intensity equal to or exceeding the defined threshold.

13. The remote access device of claim 11, wherein the first operating mode is a mode in which the wireless transmitter does not transmit wireless signals, and the second operating mode is a mode in which the wireless transmitter transmits a signal that includes at least one of a security code and a function code.

14. The remote access device of claim 11, wherein the hardware interrupt causes the wireless transmitter to transition from the first operating mode to the second operating mode for a defined period, and the wireless transmitter is configured to transition from the second operating mode to the first operating mode after the defined period.

15. A method, comprising:

causing a wireless transmitter to operate in a first mode at a first time;

detecting a first change in motion states based on a first set of measurements by the accelerometer at a second time subsequent to the first time;

causing the wireless transmitter to transition to a second mode for a defined period in response to detecting the first change in motion states;

detecting a second change in motion states based on a second set of measurements by the accelerometer at a third time subsequent to the first time;

causing the wireless transmitter to transition to the second mode for the defined period in response to detecting the second change in motion states;

detecting a third change in motion states based on a third set of measurements by the accelerometer at a fourth time subsequent to the first time; and causing the wireless transmitter to transition to the second mode for the defined period in response to detecting the third change in motion states, wherein the first change in motion states is between a first motion state of a remote access device and a second motion state of the remote access device, the second change in motion states is between the first motion state and a third motion state of the remote access device, and the third change in motion states is between the second motion state and the third motion state.

16. The method of claim 15, wherein the defined period is a period in which the wireless transmitter transmits a defined number of packets.

17. The method of claim 15, wherein causing the wireless transmitter to operate in the second mode for the defined period includes generating a hardware-based interrupt.

18. The method of claim 15, further comprising:

providing, in response to detecting the first change in motion states, a security code and a function code to the wireless transmitter;

providing, in response to detecting the second change in motion states, a second security code and the function code to the wireless transmitter; and providing, in response to detecting the third change in motion states, a third security code and the function code to the wireless transmitter.

19. The method of claim 15, further comprising:

causing the wireless transmitter to transition to the first mode after the defined period.

20. The remote access device of claim 11, wherein the accelerometer is configured to:

implement, in response to detection that the signals indicate the first change in motion states, first settings for a set of hardware registers of the accelerometer, implement, in response to detection that the signals indicate the second change in motion states, second settings for the set of hardware registers of the accelerometer, and implement, in response to detection of the signals indicating the third change in motion states, third settings for the set of hardware registers of the accelerometer.

* * * * *